(12) United States Patent
Jung et al.

(10) Patent No.: US 8,341,170 B2
(45) Date of Patent: Dec. 25, 2012

(54) APPARATUS AND METHOD FOR VISUALIZING TECHNOLOGY CHANGE

(75) Inventors: Han Min Jung, Daejeon (KR); Won Kyung Sung, Daejeon (KR); Pyung Kim, Daejeon (KR); Mi Kyung Lee, Daejeon (KR); Seung Woo Lee, Daejeon (KR); Dong Min Seo, Daejeon (KR)

(73) Assignee: Korea Institute of Science and Technology Information, Daejeon (KR)

( * ) Notice: Subject to any disclaimer, the term of this patent is extended or adjusted under 35 U.S.C. 154(b) by 0 days.

(21) Appl. No.: 13/450,918

(22) Filed: Apr. 19, 2012

(65) Prior Publication Data

US 2012/0271841 A1 Oct. 25, 2012

(30) Foreign Application Priority Data

Apr. 22, 2011 (KR) .................. 10-2011-0037797

(51) Int. Cl.
*G06F 17/30* (2006.01)
(52) U.S. Cl. .......................................... 707/758
(58) Field of Classification Search .................. None
See application file for complete search history.

(56) References Cited

U.S. PATENT DOCUMENTS

2004/0098271 A1* 5/2004 Hicks et al. ................... 705/1
2010/0114587 A1 5/2010 Masuyama et al.

FOREIGN PATENT DOCUMENTS

| EP | 1582999 A1 | 10/2005 |
| KR | 10-2005-0096924 A | 10/2005 |
| KR | 10-2009-0074688 A | 7/2009 |
| WO | 2007/148867 A1 | 12/2007 |

OTHER PUBLICATIONS

European Search Report for Application No. 12165208.5 which corresponds to the above-identified application, Oct. 1, 2012.

* cited by examiner

*Primary Examiner* — Rehana Perveen
*Assistant Examiner* — Alexander Khong
(74) *Attorney, Agent, or Firm* — LRK Patent Law Firm

(57) ABSTRACT

A technology transition visualization apparatus includes: bibliographic database integrating heterogeneous resources; technology information database storing information in technology lifecycle; interface module receiving technology from user; feature set creation module calculating feature values by searching bibliographic database and creating feature set for each technology; answer feature set creation module calculating common feature value of feature sets of technologies belonging to the same stage in technology lifecycle and creating answer feature set of each stage; stage determination module acquiring feature-related information, creating representative feature set and year-specific feature set of technology, determining representative stage or year-specific stage by comparing the representative feature set or year-specific feature set with the answer feature set, and estimating development speed of the technology; visualization module visualizing the technology lifecycle; and year-specific stage acquisition module acquiring current stage, year-specific stage and estimated next stage of the technology and visualizing the stages.

17 Claims, 7 Drawing Sheets

APPARATUS AND METHOD FOR VISUALIZING TECHNOLOGY CHANGE

BACKGROUND OF THE INVENTION

1. Field of the Invention

The present invention relates to an apparatus and method for visualizing technology transition, and more specifically, to an apparatus and method for visualizing technology transition, in which a feature set is created for each technology positioned on a technology lifecycle, and an answer feature set is created for each stage of the technology lifecycle. If a specific technology is inputted, a representative feature set and a year-specific feature set are created for the specific technology by searching a bibliographic database, and a representative stage or a year-specific stage where the specific technology belongs to in the technology lifecycle are determined by comparing the representative feature set or the year-specific feature set with the answer feature set. Then, the technology lifecycle which shows the representative stage of the specific technology is visualized, and if the specific technology is selected from the visualized technology lifecycle, a current stage, a year-specific stage and an estimated next stage of the specific technology are acquired and visualized from a technology information database.

2. Background of the Related Art

The world is moving to a knowledge-based industrial society in which knowledge and information dominate competitiveness of a country, and particularly, competitiveness in science and technologies of a country is recognized as a foundation of competitiveness of the country.

Therefore, many countries in the world are trying to draw and select core technologies and research subjects in advance and concentrate on research and development of the technologies so as to survive future competitions.

In this reason, the countries find out research themes that will lead future science and technologies of the countries and provide a technology lifecycle thereof.

However, conventionally, it is difficult to figure out a stage where a specific technology inputted by a user belongs to in the technology lifecycle and how fast the technology advances.

SUMMARY OF THE INVENTION

Accordingly, the present invention has been made in view of the above-mentioned problems occurring in the prior art, and it is an object of the present invention to provide an apparatus and method for visualizing technology transition, in which development speed of a specific technology in the future, as well as a current stage and a year-specific stage of the technology in a technology lifecycle, can be estimated using various kinds of bibliographic databases.

To accomplish the above object, according to an aspect of the present invention, there is provided a technology transition visualization apparatus including a storage and a processor and comprising: a bibliographic database for integrating heterogeneous resources; a technology information database for storing information on a representative stage, a current stage, a next stage, and a year-specific stage included in a promising technology lifecycle of each technology; an interface module for receiving a specific technology from a user; a feature set creation module for calculating feature values of predefined features by searching the bibliographic database and creating a feature set for each promising technology using the calculated feature values, for promising technologies positioned on a promising technology lifecycle; an answer feature set creation module for calculating a common feature value of feature sets of promising technologies belonging to the same stage in the promising technology lifecycle and creating an answer feature set of each stage; a stage determination module for, if a specific technology is inputted through the interface module, acquiring feature-related information for the specific technology by searching the bibliographic database, creating a representative feature set and a year-specific feature set of the specific technology using the acquired feature-related information, determining a representative stage or a year-specific stage where the specific technology belongs to in the promising technology lifecycle by comparing the representative feature set or the year-specific feature set with the answer feature set, and estimating development speed of the specific technology using the year-specific stage; a visualization module for visualizing the promising technology lifecycle which shows the representative stage of the specific technology; and a year-specific stage acquisition module for, if the specific technology is selected from the visualized promising technology lifecycle, acquiring a current stage, a year-specific stage and an estimated next stage of the specific technology from the technology information database and visualizing the acquired stages through the visualization module.

The bibliographic database integrates at least one of resources such papers, patents, reports, academic data, newspapers, and standards, and each of the resources can be categorized by the year.

The predefined feature includes at least one of the number of respective resources, ratios among the resources, the number of fields where a corresponding technology is found in each resource, the number of lower technology names, the number of researchers, an index of national competitiveness and growth potential, update records, records on final disposition, a period, a technical field classification table, the number of journals, the number of proceedings, a name of an author, a belonging organization, and a name of a journal.

The feature set creation module includes: a feature-related information acquisition unit for acquiring feature-related information for calculating feature values of features contained in a predefined feature set by searching the bibliographic database for the promising technologies; a feature value calculation unit for calculating a feature value of each promising feature by technology using the acquired feature-related information; and a feature set creation unit for creating a feature set containing the calculated feature values for each promising technology.

The answer feature set creation module obtains common feature values for discriminating feature values of the technologies belonging to the same stage in the promising technology lifecycle from feature values of the other stages, and creates an answer feature set of each stage based on the common feature values.

The common feature value is at least one of an average, a range defined by minimum and maximum values, and a standard deviation.

The stage determination module includes: a feature-related information acquisition unit for, if the specific technology is inputted, acquiring feature-related information for calculating feature values of features contained in a predefined feature set by searching the bibliographic database; a feature value calculation unit for calculating a representative feature value of each feature using the acquired feature-related information and calculating year-specific feature values by classifying the feature-related information by the year; a feature set creation unit for creating a representative feature set using the calculated representative feature values and creating a year-specific feature set using the year-specific feature set; a stage determination unit for determining a representative stage where the specific technology belongs to in the promising technology lifecycle by comparing the representative feature set with the answer feature set, and determining a year-specific stage of the specific technology by comparing the year-specific feature set with the answer feature set; and a development speed estimation unit for estimating a stage where the next stage of the specific technology will belong to in the promising technology lifecycle or a time required to move to the next stage, using the determined year-specific stage.

The stage determination unit obtains a similarity to the answer feature set of each stage by applying a weighting factor to each feature value contained in the representative feature set, determines a stage of an answer feature set having the highest similarity as a stage where the specific technology belongs to in the promising technology lifecycle, and stores the determined stage in the technology information database, and the weighting factor is a weighting factor indicated in the answer feature set of each stage.

The stage determination unit obtains a similarity to the answer feature set of each stage by applying a weighting factor to each feature value contained in the year-specific feature set, determines a stage of an answer feature set having the highest similarity as a year-specific stage of the specific technology, and stores the determined stage in the technology information database, and the weighting factor is a weighting factor indicated in the answer feature set of each stage.

If the specific technology is selected from the visualized promising technology lifecycle, the year-specific stage acquisition module acquires technologies related to the specific technology from the technology information database and visualizes the related technologies, together with the current stage, the year-specific stage and the estimated next stage of the specific technology, through the visualization module, and if a specific related technology is selected from the visualized related technologies, the year-specific stage acquisition module acquires a current stage, a year-specific stage and an estimated next stage of the specific related technology and visualizes the acquired stages through the visualization module.

To accomplish the above objects, according to another aspect of the present invention, there is provided a computer-implemented visualization method of technology transition including the steps of: (a) creating a feature set for each technology positioned on a promising technology lifecycle; (b) calculating a common feature value of feature sets of promising technologies belonging to the same stage in the promising technology lifecycle and creating an answer feature set of each stage; (c) if a specific technology is inputted, acquiring feature-related information for the specific technology by searching a bibliographic database and creating a representative feature set and a year-specific feature set of the specific technology using the acquired feature-related information; (d) determining a representative stage or a year-specific stage where the specific technology belongs to in the promising technology lifecycle by comparing the representative feature set or the year-specific feature set with the answer feature set, and estimating development speed of the specific technology using the year-specific stage; (e) visualizing the promising technology lifecycle which shows the representative stage of the specific technology; and (f) if the specific technology is selected from the visualized promising technology lifecycle, acquiring and visualizing a current stage, a next stage and a year-specific stage of the specific technology from a technology information database.

Step (a) includes the steps of: acquiring feature-related information for calculating feature values of features contained in a predefined feature set by searching the bibliographic database for the promising technologies; calculating a feature value of each feature by technology using the acquired feature-related information; and creating a feature set containing the calculated feature values for each technology.

Step (b) obtains common feature values for discriminating feature values of the promising technologies belonging to the same stage in the promising technology lifecycle from feature values of the other stages, and creates an answer feature set of each stage based on the common feature values.

The common feature value is at least one of an average, a range defined by minimum and maximum values, and a standard deviation.

Step (c) includes the steps of: if the specific technology is inputted, acquiring feature-related information for calculating feature values of features contained in a predefined feature set by searching the bibliographic database; calculating a representative feature value of each feature using the acquired feature-related information and calculating year-specific feature values by classifying the feature-related information by the year; and creating a representative feature set using the calculated representative feature values and creating a year-specific feature set using the year-specific feature set.

Step (d) includes the steps of: (d-1) determining a representative stage where the specific technology belongs to in the promising technology lifecycle by comparing the representative feature set with the answer feature set, and determining a year-specific stage by comparing the year-specific feature set with the answer feature set; and (d-2) estimating a stage where the next stage of the specific technology will belong to in the promising technology lifecycle or a time required to move to the next stage, using the determined year-specific stage.

Step (d-1) obtains a similarity to the answer feature set of each stage by applying a weighting factor to each feature value contained in the representative feature set, determines a stage of an answer feature set having the highest similarity as a stage where the specific technology belongs to in the promising technology lifecycle, and stores the determined stage in the technology information database, and the weighting factor is a weighting factor indicated in the answer feature set of each stage.

Step (d-1) obtains a similarity to the answer feature set of each stage by applying a weighting factor to each feature value contained in the year-specific feature set, determines a stage of an answer feature set having the highest similarity as a year-specific stage of the specific technology, and stores the determined stage in the technology information database, and the weighting factor is a weighting factor indicated in the answer feature set of each stage.

Step (f) includes the steps of: if the specific technology is selected from the visualized technology lifecycle, acquiring technologies related to the specific technology from the technology information database and visualizing the related technologies, together with the current stage, the year-specific stage and the estimated next stage of the specific technology; and if a specific related technology is selected from the visualized related technologies, acquiring and visualizing a current stage, a year-specific stage and an estimated next stage of the specific related technology.

As described above, according to the present invention, development speed of a specific technology in the future, as well as a current stage and a year-specific stage of the technology in a technology lifecycle, can be estimated using various kinds of bibliographic databases.

Furthermore, supplementary information secured from different documents can be additionally used by utilizing various kinds of bibliographic databases, and thus a current stage in a technology lifecycle can be obtained, and a time required to move to a next stage can be estimated.

DESCRIPTION OF SYMBOLS

Figure 1:
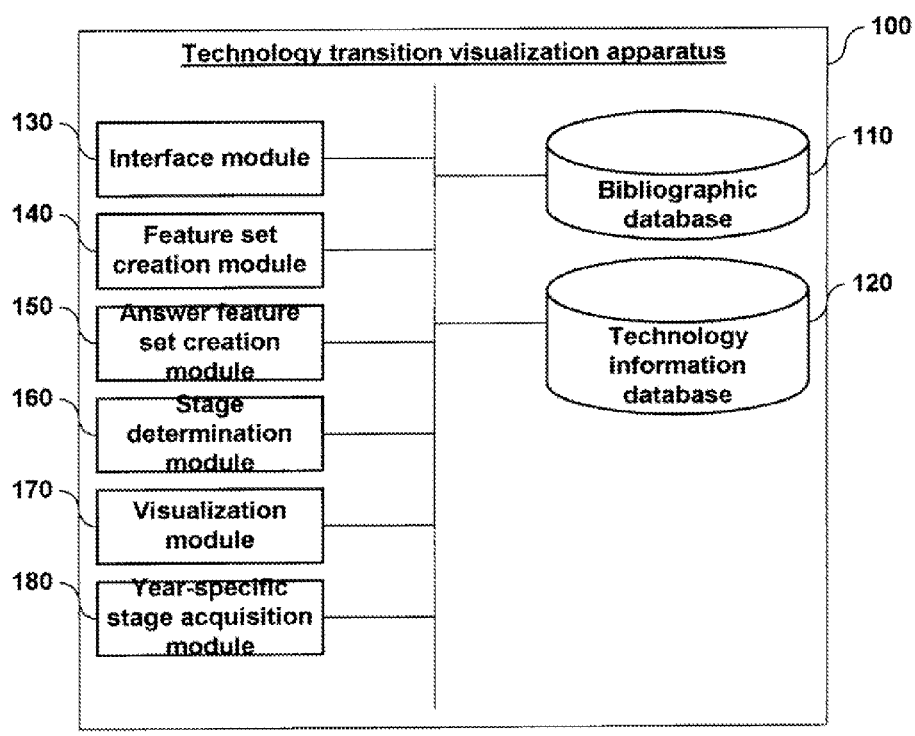
FIG. 1 is a block diagram schematically showing the configuration of a technology transition visualization apparatus according to the present invention.

100: Technology transition visualization apparatus
110: Bibliographic database
120: Technology information database
130: Interface module
140: Feature set creation module
142, 161: Feature-related information acquisition unit
144, 162: Feature value calculation unit
146, 163: Feature set creation unit
150: Answer feature set creation module
160: Stage determination module
164: Stage determination unit
165: Development speed estimation unit
170: Visualization module
180: Year-specific stage acquisition module

DETAILED DESCRIPTION OF THE PREFERRED EMBODIMENT

Details of the objects, technical configurations, and operational effects of the present invention described above will be further clearly understood hereinafter according to the detailed descriptions with reference to the drawings accompanied in the specification of the present invention.

Figure 2:
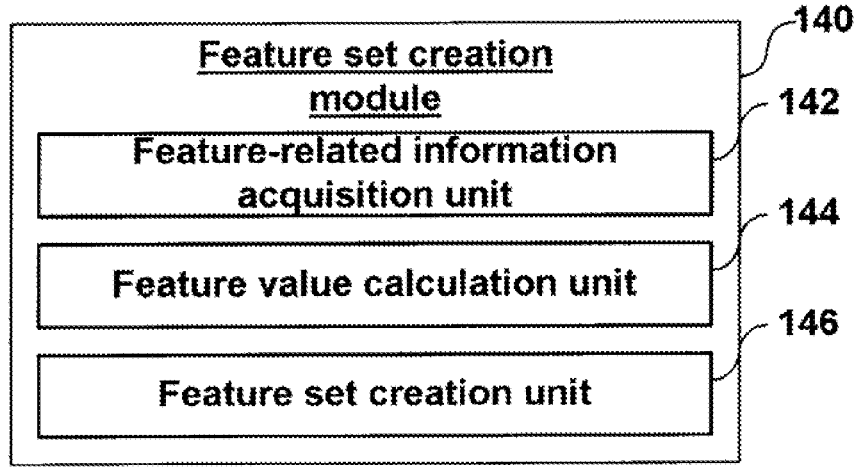
FIG. 2 is a block diagram specifically showing the configuration of a feature set creation module of FIG. 1.
Figure 3:
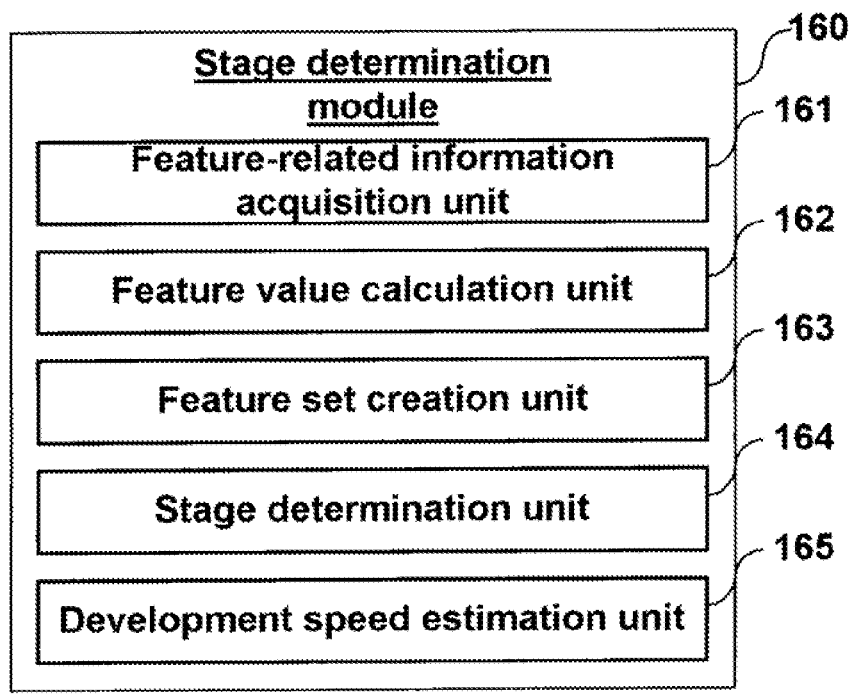
FIG. 3 is a block diagram specifically showing the configuration of a stage determination module of FIG. 1.

FIG. 1 is a block diagram schematically showing the configuration of a technology transition visualization apparatus according to the present invention, FIG. 2 is a block diagram specifically showing the configuration of a feature set creation module of FIG. 1, and FIG. 3 is a block diagram specifically showing the configuration of a stage determination module of FIG. 1.

Referring to FIG. 1, the technology transition visualization apparatus 100 includes a bibliographic database 110, a technology information database 120, an interface module 130, a feature set creation module 140, an answer feature set creation module 150, a stage determination module 160, a visualization module 170, and a year-specific stage acquisition module 180.

The bibliographic database 110 integrates at least one of resources such as papers, patents, reports, academic data, newspapers, and standards.

Each of the resources stored in the bibliographic database 110 can be categorized by the year, and thus a year-specific feature set can be created later.

The technology information database 120 stores information on a representative stage and a year-specific stage included in the technology lifecycle of each technology. Here, the representative stage is a stage where a corresponding technology representatively belongs to among the stages included in the technology lifecycle, i.e., a stage that will be displayed on the technology lifecycle, and the year-specific stage includes a stage of the current year, stages of the years before the current year, and stages of the years after the current year, which show shifts of phases in developing the technology.

That is, the technology information database 120 stores the representative stage, the year-specific stage, development speed and the like of a specific technology determined by the stage determination module 160.

In addition, the technology information database 120 stores information on technologies related to each technology. Here, the related technologies include technologies recorded together in a document and technologies specified as an upper technology, a lower technology or a related technology of a corresponding technology in a thesaurus.

The interface module 130 performs interfaces with a user and receives a specific technology from the user. For example, the interface module 130 is an interface module or a key input unit connected to a user terminal through a communication network.

The feature set creation module 140 obtains feature values of predefined features by searching the bibliographic database 110 and creates a feature set for each technology using the calculated feature values, for technologies positioned on the technology lifecycle.

The technology lifecycle may be a graph where stages of various technologies are displayed.

Accordingly, in the technology lifecycle, a technology development process is divided into stages expressed in numerals such as "first stage, second stage, and third stage" or stages describing the technology from the birth such as "Technology Trigger, Peak of inflated expectations, Trough of disillusionment, Slope of enlightenment." The stages divided in the technology lifecycle may be determined by an engineer who has developed the cycle.

Referring to FIG. 2 for the feature set creation module 140, the feature set creation module 140 includes a feature-related information acquisition unit 142, a feature value calculation unit 144 and a feature set creation unit 146.

The feature-related information acquisition unit 142 acquires feature-related information for calculating feature values of features contained in a predefined feature set by searching the bibliographic database 110 for the technologies. Here, the features contained in the feature set are previously defined as the number of papers, the number of patents, a grade of a country, ratios among resources, the number of fields where a corresponding technology is found in each resource, the number of lower technology names, the number of researchers, a technical field classification table, the number of journals, the number of proceedings, a name of an author, a name of a journal, and the like.

The feature-related information is base information for obtaining the features described above, such as papers, patents and the like related to a corresponding technology.

The feature value calculation unit 144 obtains a feature value of each feature by the technology using the acquired feature-related information.

For example, if the feature-related information is papers and patents, the feature value calculation unit obtains feature values of the features, such as the number of papers, the number of patents, a grade of a country, a ratio of papers to patents, the number of fields where a corresponding technology is found in the paper, the number of lower technology names, the number of researchers and the like, using the acquired papers and patents.

The feature set creation unit 146 creates a feature set containing the calculated feature values for each technology. That is, the feature set creation unit 146 creates a feature set shown in Table 1 by the technology.

TABLE 1

| ID | Descriptions | Value | Unit |
|----|---|---|---|
| 1 | Ratio of papers to patents | 130 | % |
| 2 | The number of papers | 17 | piece |
| 3 | The number of fields where a corresponding technology is found in a paper | 4 | piece |
| 4 | The number of lower technology names | 8 | piece |
| 5 | ... | | |

Referring to Table 1, the feature set contains features and feature values corresponding to the features, and the feature values are expressed in a unit such as %, the number of pieces, the number of cases or the like.

The features contained in the feature set are predefined elements such as a ratio of papers to patents, the number of fields where a corresponding technology is found in a paper, the number of lower technology names and the like.

The answer feature set creation module 150 obtains a common feature value of feature sets of technologies belonging to the same stage in the technology lifecycle and creates an answer feature set of each stage.

That is, the answer feature set creation module 150 obtains common feature values for discriminating feature values of the technologies belonging to the same stage in the technology lifecycle from feature values of the other stages, and creates an answer feature set of each stage based on the common feature values. Here, the common feature value is an average, a range defined by minimum and maximum values, a standard deviation, or the like.

For example, a method of creating an answer feature set of each stage by the answer feature set creation module 150 is described using a case in which the technology lifecycle includes five stages of stage one to five and there are five technologies in the first stage, eight technologies in the second stage, twelve technologies in the third stage, ten technologies in the fourth stage, and five technologies in the fifth stage.

The answer feature set creation module 150 obtains common feature values for discriminating feature values of the five technologies belonging to the first stage and creates an answer feature set of the first stage based on the common feature values.

In addition, the answer feature set creation module 150 obtains common feature values for discriminating feature values of the eight technologies belonging to the second stage and creates an answer feature set of the second stage based on the common feature values.

In addition, the answer feature set creation module 150 obtains common feature values for discriminating feature values of the twelve technologies belonging to the third stage and creates an answer feature set of the third stage based on the common feature values.

In addition, the answer feature set creation module 150 obtains common feature values for discriminating feature values of the ten technologies belonging to the fourth stage and creates an answer feature set of the fourth stage based on the common feature values.

In addition, the answer feature set creation module 150 obtains common feature values for discriminating feature values of the five technologies belonging to the fifth stage and creates an answer feature set of the fifth stage based on the common feature values.

The answer feature set created by the answer feature set creation module 150 is as shown in Table 2.

TABLE 2

| 'Technology Trigger' stage | | | | |
|---|---|---|---|---|
| ID | Descriptions | Value | Unit | Weighting factor |
| 1 | Ratio of papers to patents | 100~300 | % | 0.2 |
| 2 | The number of papers | 1~5 | piece | 0.3 |
| 3 | The number of fields where a corresponding technology is found in a paper | 1~2 | piece | 0.15 |
| 4 | The number of lower technology names | Less than 5 | piece | 0.1 |
| 5 | ... | | | |

Figure 6:
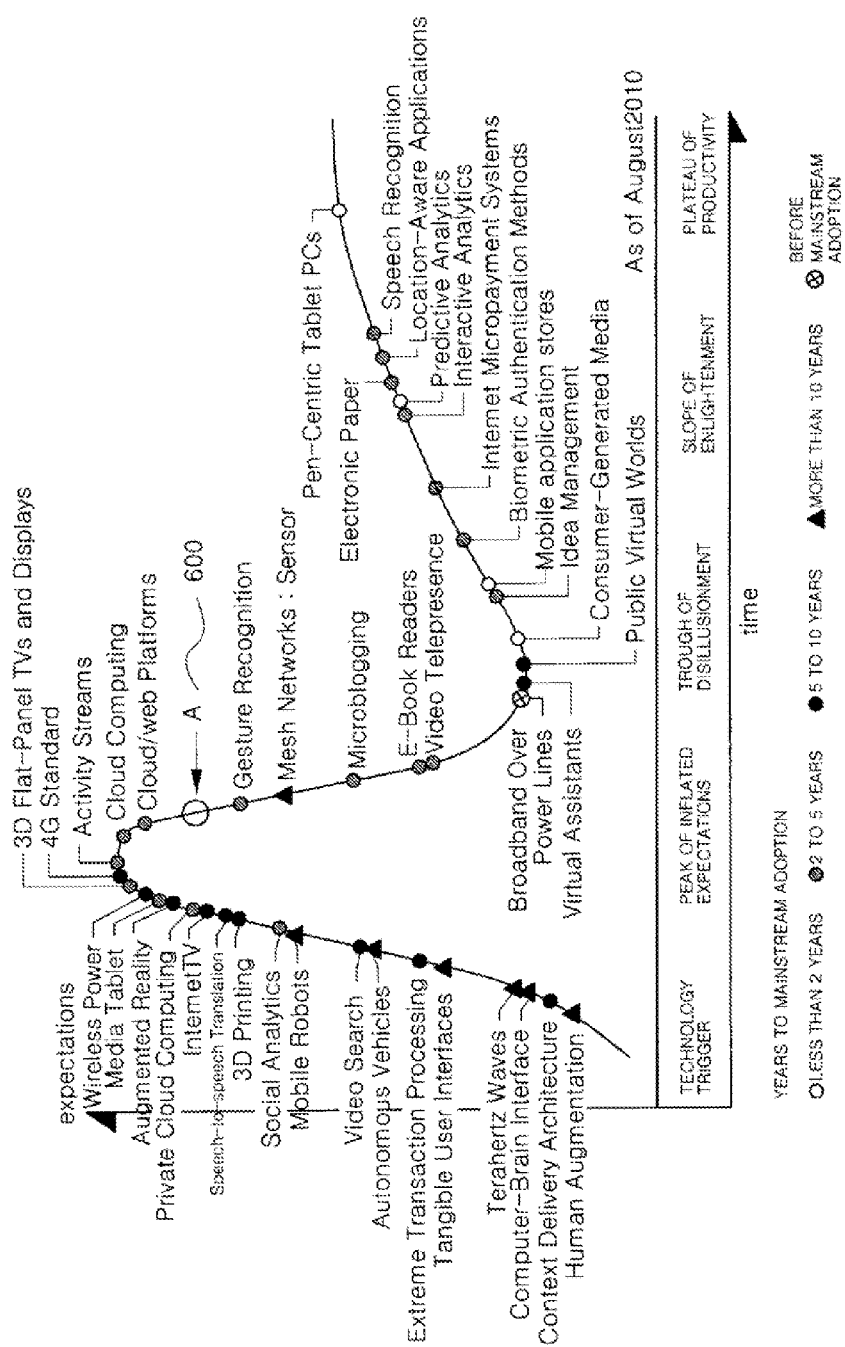
FIGS. 6 and 7 are views respectively showing an example of a technology lifecycle which shows a specific technology.

Table 2 shows an answer feature set corresponding to stage "Technology Trigger" in the technology lifecycle shown in FIG. 6.

Common feature values, units of the feature values and weighting factors are set in the answer feature set. The weighting factor is used to obtain a similarity for determining a stage where a specific technology belongs to.

In some of the technologies, feature values of a specific stage may be overlapped with feature values of the other stages. Therefore, the answer feature set creation module 150 obtains common feature values for discriminating feature values of each stage and creates an answer feature set of each stage, in a method of excluding such cases as collisions occur among the stages by removing feature values overlapped among different stages and removing extreme feature values in each stage.

If a specific technology is inputted through the interface module 130, the stage determination module 160 acquires feature-related information for the specific technology by searching the bibliographic database 110 and creates a representative feature set and a year-specific feature set of the specific technology using the acquired feature-related information. Then, the stage determination module 160 determines a stage where the specific technology belongs to or a year-specific stage in the technology lifecycle by comparing the representative feature set or the year-specific feature set with the answer feature set and estimates development speed of the specific technology using the year-specific stage.

Referring to FIG. 3 for the stage determination module 160, the stage determination module 160 includes a feature-related information acquisition unit 161, a feature value calculation unit 162, a feature set creation unit 163, a stage determination unit 164 and a development speed estimation unit 165.

If a specific technology is inputted, the feature-related information acquisition unit 161 acquires feature-related information for calculating feature values of features contained in a predefined feature set by searching the bibliographic database 110.

The feature value calculation unit 162 obtains a representative feature value of each feature using the feature-related information acquired by the feature-related information acquisition unit 161 and year-specific feature values by classifying the feature-related information by the year.

The feature set creation unit 163 creates a representative feature set using the representative feature values calculated by the feature value calculation unit 162 and creates a year-specific feature set using the year-specific feature set.

For example, the feature set creation unit 163 creates a feature set of the specific technology for the years of 2008, 2009, 2010 and 2011, respectively.

The stage determination unit 164 determines a stage where the specific technology belonging to in the technology lifecycle by comparing the representative feature set with the answer feature set and determines a current stage and a year-specific stage of the specific technology by comparing year-specific feature set with the answer feature set.

At this point, the stage determination unit 164 obtains a similarity to the answer feature set of each stage by applying a weighting factor to each feature value contained in the representative feature set, determines a stage of an answer feature set having the highest similarity as a stage where the specific technology belongs to in the technology lifecycle, and stores the determined stage in the technology information database. In other words, the stage determination unit 164 determines a stage of an answer feature set having a common feature value closest to the representative feature value of the representative feature set among common feature values of the answer feature set of each stage as a stage where the specific technology belongs to in the technology lifecycle, and stores the determined stage in the technology information database.

In addition, the stage determination unit 164 obtains a similarity to the answer feature set of each stage by applying a weighting factor to each feature value contained in the year-specific feature set, determines a stage of an answer feature set having the highest similarity as a year-specific stage of the specific technology, and stores the determined stage in the technology information database. Here, the weighting factor may be a weighting factor indicated in the answer feature set of each stage. In other words, the stage determination unit 164 determines a stage of an answer feature set having a common feature value closest to the feature value of the year-specific feature set among common feature values of the answer feature set of each stage as a year-specific stage of the specific technology, and stores the determined stage in the technology information database.

For example, if the feature set of the year 2010 of the specific technology is compared with the answer feature set and the feature set of the year 2010 of the specific technology is most similar to the third stage of the answer feature set as a result of the comparison, the stage determination unit 164 determines that the feature set of the year 2010 of the specific technology belongs to the third stage in the technology lifecycle.

Through the method described above, the stage determination unit 164 determines the year-specific stage for the specific technology.

The development speed estimation unit 165 estimates a stage where the next stage of the specific technology belongs to in the technology lifecycle or a time required to move to the next stage, using the year-specific stage determined by the stage determination unit 164.

The development speed estimation unit 165 estimates development speed using, for example, an exponential moving average.

For example, year-specific stages are determined as follows: the first stage in 2005, the first stage in 2006, the second stage in 2007, the third stage in 2008, the third stage in 2009, and the third stage in 2010, and this will be described below.

Since exponential moving averages of three-year intervals are calculated as 1.33 in the period of 2005 to 2007, 2 in the period of 2006 to 2008, 2.66 in the period of 2007 to 2009 and 3 in the period of 2008 to 2010, an average value of about 3.18 will be calculated for the period of 2009 to 2011 based on the slope of the average values.

If an exponential moving average is calculated for the stage of 2011 using the exponential moving average calculated for the period of 2009 to 2011, it will be 3.54.

Therefore, the development speed estimation unit 165 may estimate a year when the technology will be in the fourth stage or the fifth stage after the third stage using the method described above.

The visualization module 170 visualizes the technology lifecycle which shows the representative stage of the specific technology.

In addition, the visualization module 170 visualizes the technology lifecycle which shows the current stage, the next stage and the year-specific stage of the specific technology.

If the specific technology is selected from the visualized technology lifecycle, the year-specific stage acquisition module 180 acquires a year-specific stage and an estimated next stage of the specific technology from the technology information database 120 and visualizes the acquired stages through the visualization module 170.

In addition, if the specific technology is selected from the visualized technology lifecycle, the year-specific stage acquisition module 180 acquires technologies related to the specific technology from the technology information database 120 and visualizes the related technologies, together with the current stage, the year-specific stage and the estimated next stage of the specific technology, through the visualization module 170. Here, the technologies related to the specific technology are visualized as a list.

In addition, if a specific related technology is selected from the visualized related technologies, the year-specific stage acquisition module 180 acquires a current stage, a year-specific stage and an estimated next stage of the specific related technology and visualizes the acquired stages through the visualization module 170.

Figure 4:
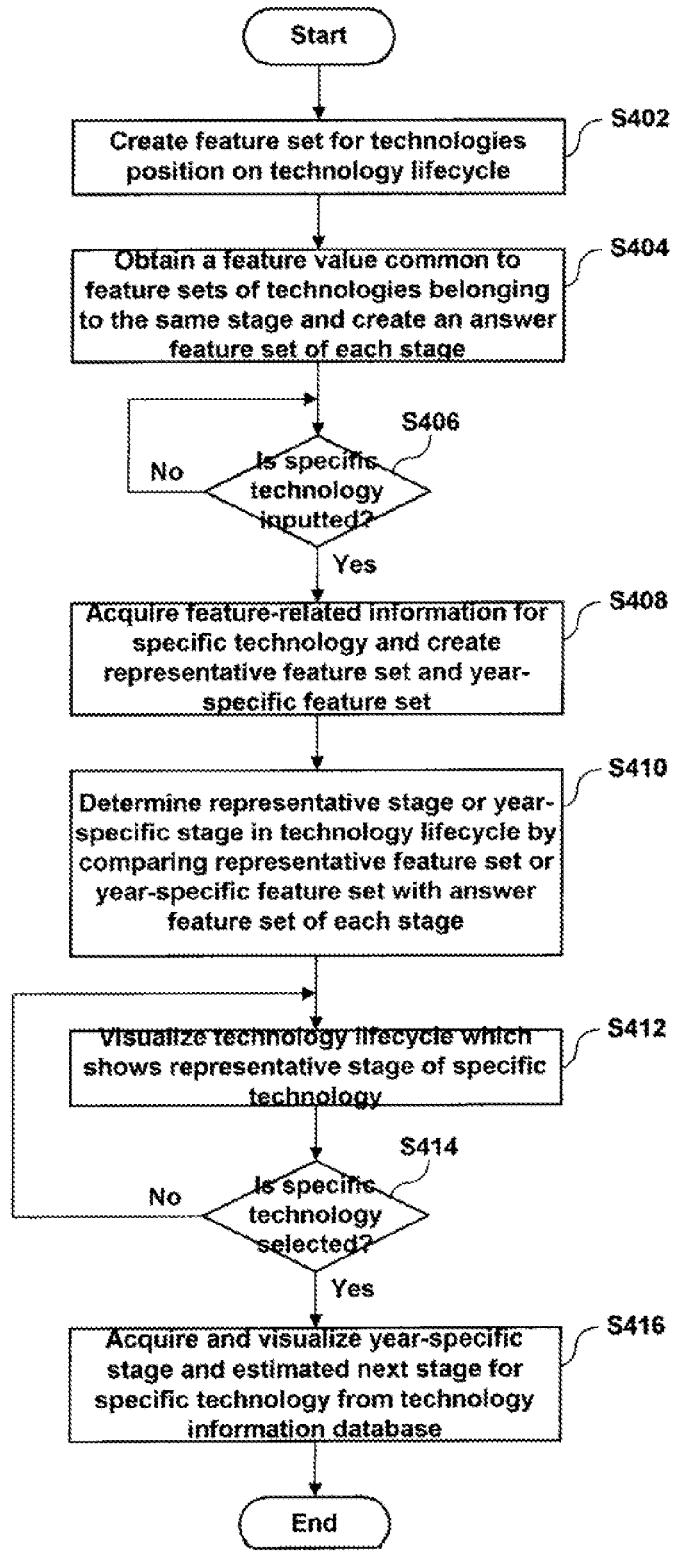
FIG. 4 is a flowchart illustrating a computer-implemented visualization method of technology transition performed by a technology transition visualization apparatus according to the present invention.

FIG. 4 is a flowchart illustrating a computer-implemented visualization method of technology transition performed by a technology transition visualization apparatus according to the present invention.

Referring to FIG. 4, the technology transition visualization apparatus creates a feature set for each technology positioned on a technology lifecycle S402.

A technique of the technology transition visualization apparatus for creating a feature set for each technology will be described in detail with reference to FIG. 5.

After performing step S402, the technology transition visualization apparatus obtains a common feature value of feature sets of technologies belonging to the same stage in the technology lifecycle and creates an answer feature set of each stage S404. That is, the technology transition visualization apparatus obtains common feature values for discriminating feature values of the technologies belonging to the same stage in the technology lifecycle from feature values of the other stages, and creates an answer feature set of each stage based on the common feature values.

If a specific technology is inputted S406 after performing step S404, the technology transition visualization apparatus acquires feature-related information for the specific technology by searching the bibliographic database and creates a representative feature set and a year-specific feature set of the specific technology using the acquired feature-related information S408. That is, if the specific technology is inputted, the technology transition visualization apparatus acquires feature-related information for calculating feature values of features contained in a predefined feature set by searching the bibliographic database. Then, the technology transition visualization apparatus obtains a representative feature value of each feature using the acquired feature-related information and year-specific feature values by classifying the feature-related information by the year.

Then, the technology transition visualization apparatus creates a representative feature set using the calculated representative feature values and creates a year-specific feature set using the year-specific feature set.

After performing step S408, the technology transition visualization apparatus determines a representative stage or a year-specific stage where the specific technology belongs to in the technology lifecycle by comparing the representative feature set or the year-specific feature set with the answer feature set S410. At this point, the technology transition visualization apparatus estimates development speed of the specific technology using the year-specific stage. That is, the technology transition visualization apparatus estimates a stage where the next stage of the specific technology will belong to in the technology lifecycle or a time required to move to the next stage. The technology transition visualization apparatus may estimate the development speed using a variety of methods such as an exponential moving average, regression analysis and the like.

In addition, the technology transition visualization apparatus also determines a current stage of the specific technology.

After performing step S410, the technology transition visualization apparatus visualizes the technology lifecycle which shows the representative stage of the specific technology S412.

If the specific technology is selected from the visualized technology lifecycle S414, the technology transition visualization apparatus acquires and visualizes a current stage, a next stage and a year-specific stage of the specific technology from the technology information database S416.

That is, the technology transition visualization apparatus visualizes the technology lifecycle which shows the representative stage of specific technology 'A' as shown in FIG. 6.

The technology lifecycle described here includes five stages in total; such as a Technology Trigger stage, a Peak of Inflated Expectations stage, a Trough of Disillusionment stage, a Slope of Enlightenment stage, and a Plateau of Productivity stage.

Each stage shows technologies belonging to the stage, as well as the specific technology. For example, technologies of Biometric Authentication Methods, Internet Micropayment System, Interactive TV, Predictive Analytic, Electronic Paper, Location Aware Application, and Speech Recognition are shown in the Slope of Enlightenment stage, and specific technology 'A' is shown in the Peak of Inflated Expectations stage.

Figure 7A:
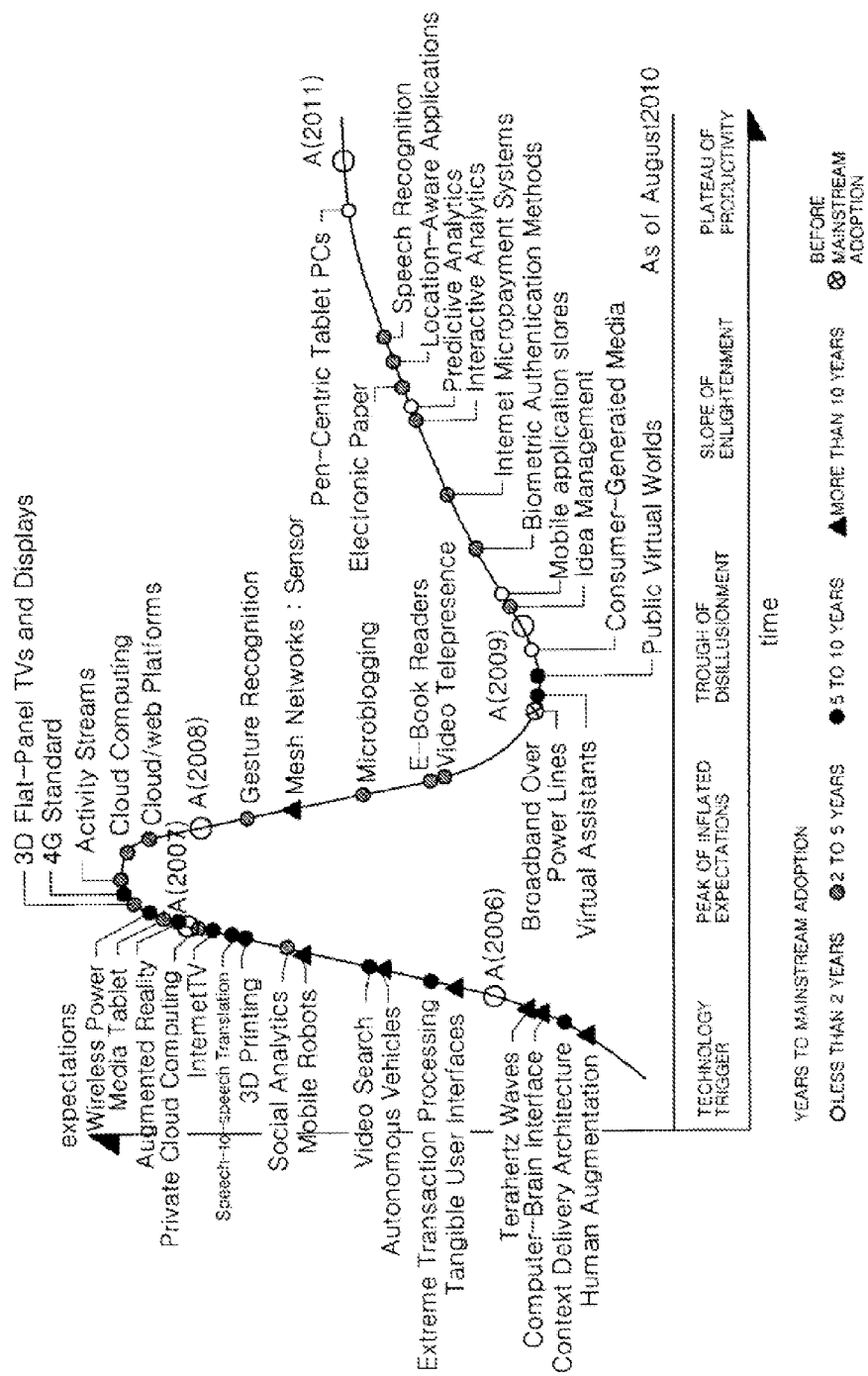

If a user selects technology 'A' 600 from the visualized technology lifecycle, the technology transition visualization apparatus visualizes a technology lifecycle which shows a current stage, a year-specific stage and an estimated next stage of technology 'A' as shown in FIG. 7A. That is, the technology transition visualization apparatus visualizes the technology lifecycle which shows the stages of the years of 2006, 2007, 2008, 2009, 2010 and 2011 for technology 'A'.

The user may easily confirm a stage where the specific technology inputted by the user belongs to, together with the year-specific stage and the future stages, using the visualized technology lifecycle.

Figure 7B:
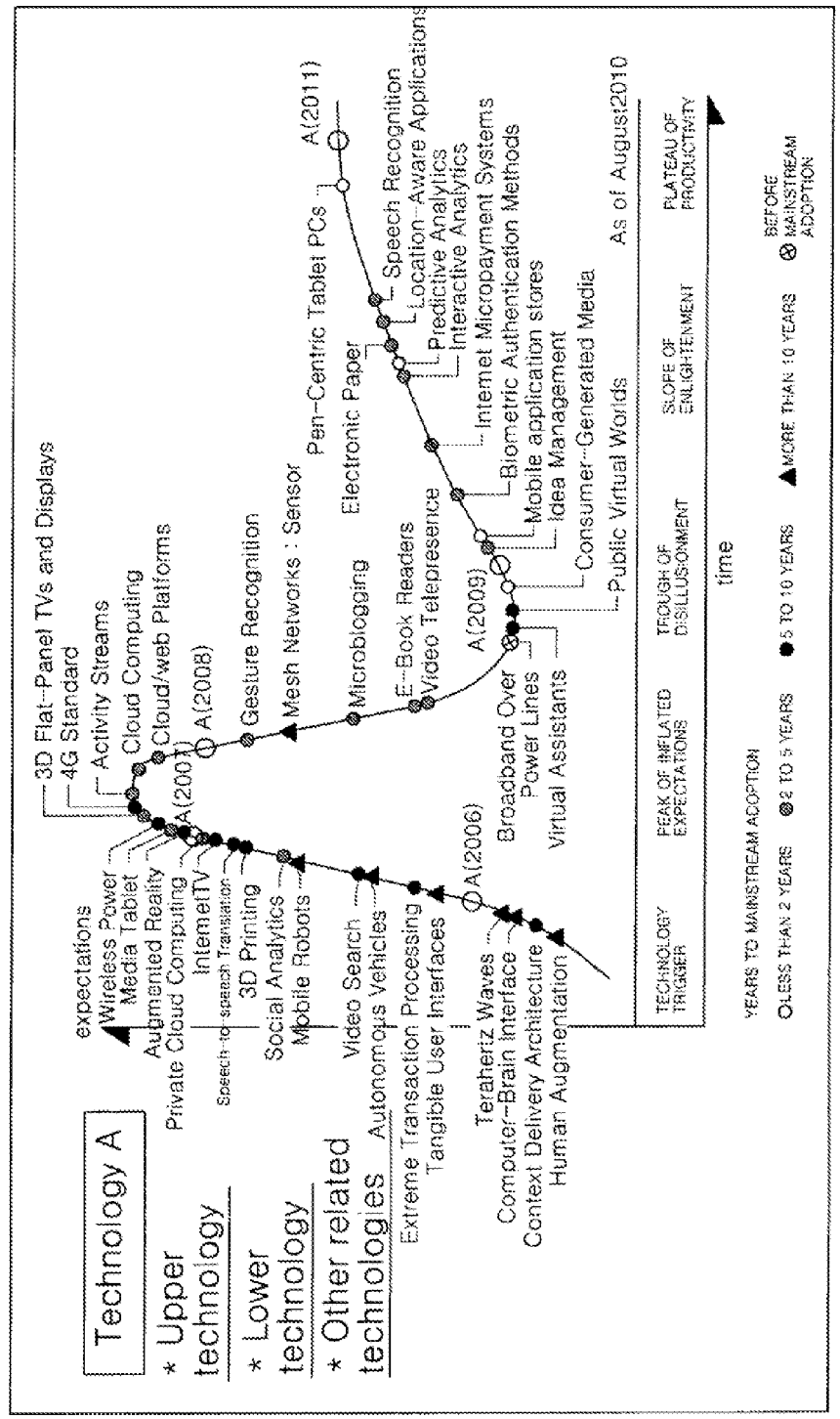

In addition, if the user selects technology 'A' 600 from the visualized technology lifecycle, the technology transition visualization apparatus visualizes technologies related to technology 'A', together with the current stage, the year-specific stage and the estimated next stage of technology 'A', as shown in FIG. 7B. Here, the technologies related to technology 'A' is visualized in the form of a list including an upper technology, a lower technology and other related technologies, in addition to a graph visualizing the current stage, the year-specific stage and the estimated next stage of technology 'A'.

If the upper technology is selected, a list of upper technologies of technology 'A' is visualized, and if the lower technology is selected, a list of lower technologies of technology 'A' is visualized. If the 'other related technologies' is selected, a list of other related technologies of technology 'A' is visualized.

If a specific related technology is selected among the visualized related technologies, the technology transition visualization apparatus visualizes a current stage, a year-specific stage and an estimated next stage of the specific related technology.

For example, if a lower technology is selected for 'neural network', the technology transition visualization apparatus visualizes a list of lower technologies such as 'artificial neural network', 'SOM' and the like, and if 'SOM' is selected, the technology transition visualization apparatus visualizes a current stage, a year-specific stage and an estimated next stage of 'SOW'.

Here, although the stages of the technology lifecycle are expressed as five stages in total, such as the Technology Trigger stage, the Peak of Inflated Expectations stage, the Trough of Disillusionment stage, the Slope of Enlightenment stage and the Plateau of Productivity stage, the stages of the technology lifecycle can be set or modified in a different form such as a first stage, a second stage, a third stage and the like.

Figure 5:
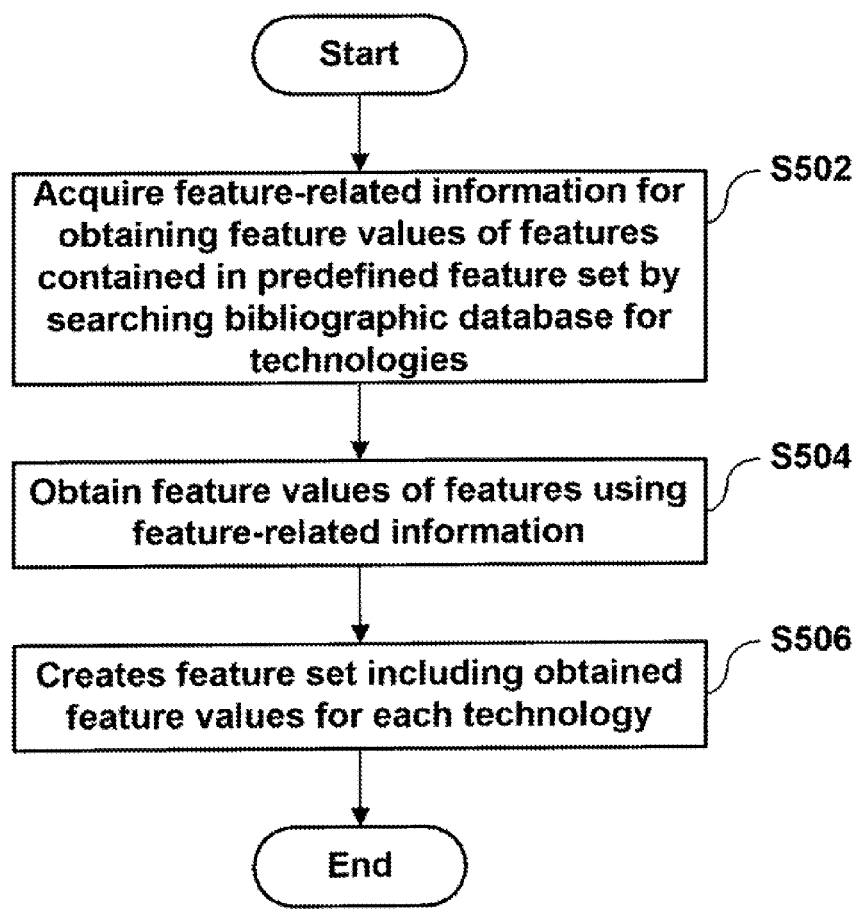
FIG. 5 is a flowchart illustrating a method of creating a feature set for each technology by a technology transition visualization apparatus according to the present invention.

FIG. 5 is a flowchart illustrating a method of creating a feature set for each technology by a technology transition visualization apparatus according to the present invention.

Referring to FIG. 5, the technology transition visualization apparatus acquires feature-related information for calculating feature values of features contained in a predefined feature set by searching the bibliographic database for the technologies S502.

Then, the technology transition visualization apparatus obtains a feature value of each feature by the technology using the acquired feature-related information S504 and creates a feature set containing the calculated feature values for each technology S506.

Through the method described above, a feature set of all the technologies shown on the technology lifecycle is created.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A technology transition visualization apparatus including a storage and a processor and comprising:
- a bibliographic database configured to integrate heterogeneous resources;
- a technology information database configured to store information on a representative stage, a current stage, a next stage, and a year-specific stage included in a technology lifecycle of each technology;
- an interface module configured to receive a specific technology from a user;
- a feature set creation module configured to calculate feature values of predefined features by searching the bibliographic database and to create a feature set for each technology using the calculated feature values, for technologies positioned on a technology lifecycle;
- an answer feature set creation module configured to calculate a common feature value of feature sets of technologies belonging to the same stage in the technology lifecycle and to create an answer feature set of each stage;
- a stage determination module configured to, if a specific technology is inputted through the interface module, acquire feature-related information for the specific technology by searching the bibliographic database, to create a representative feature set and a year-specific feature set of the specific technology using the acquired feature-related information, to determine a representative stage or a year-specific stage where the specific technology belongs to in the technology lifecycle by comparing the representative feature set or the year-specific feature set with the answer feature set, and to estimate development speed of the specific technology using the year-specific stage;
- a visualization module configured to visualize the technology lifecycle which shows the representative stage of the specific technology; and
- a year-specific stage acquisition module configured to, if the specific technology is selected from the visualized technology lifecycle, acquire a current stage, a year-specific stage and an estimated next stage of the specific technology from the technology information database and to visualize the acquired stages through the visualization module,
- wherein the stage determination module includes:
- a feature-related information acquisition unit configured to, if the specific technology is inputted, acquire feature-related information for calculating feature values of features contained in a predefined feature set by searching the bibliographic database;
- a feature value calculation unit configured to calculate a representative feature value of each feature using the acquired feature-related information and to calculate year-specific feature values by classifying the feature-related information by the year;
- a feature set creation unit configured to create a representative feature set using the calculated representative feature values and to create a year-specific feature set using the year-specific feature set;
- a stage determination unit configured to determine a representative stage where the specific technology belongs to in the technology lifecycle by comparing the representative feature set with the answer feature set, and to determine a year-specific stage of the specific technology by comparing the year-specific feature set with the answer feature set; and
- a development speed estimation unit configured to estimate a stage where the next stage of the specific technology will belong to in the technology lifecycle or a time required to move to the next stage, using the determined year-specific stage.

2. The apparatus according to claim 1, wherein the bibliographic database integrates at least one of resources such as papers, patents, reports, academic data, newspapers, and standards, and each of the resources can be categorized by the year.

3. The apparatus according to claim 1, wherein the predefined feature includes at least one of the number of respective resources, ratios among the resources, the number of fields where a corresponding technology is found in each resource, the number of lower technology names, the number of researchers, a technical field classification table, the number of journals, the number of proceedings, a name of an author, and a name of a journal.

4. The apparatus according to claim 1, wherein the feature set creation module includes:
- a feature-related information acquisition unit configured to acquire feature-related information for calculating feature values of features contained in a predefined feature set by searching the bibliographic database for the technologies;
- a feature value calculation unit configured to calculate a feature value of each feature by technology using the acquired feature-related information; and
- a feature set creation unit configured to create a feature set containing the calculated feature values for each technology.

5. The apparatus according to claim 1, wherein the answer feature set creation module calculates common feature values for discriminating feature values of the technologies belonging to the same stage in the technology lifecycle from feature values of the other stages, and creates an answer feature set of each stage based on the common feature values.

6. The apparatus according to claim 1, wherein the common feature value is at least one of an average, a range defined by minimum and maximum values, and a standard deviation.

7. The apparatus according to claim 1, wherein the stage determination unit determines a stage of an answer feature set having a common feature value closest to the representative feature value of the representative feature set among common feature values of the answer feature set of each stage as a stage where the specific technology belongs to in the technology lifecycle, and stores the determined stage in the technology information database.

8. The apparatus according to claim 1, wherein the stage determination unit determines a stage of an answer feature set having a common feature value closest to the feature value of the year-specific feature set among common feature values of the answer feature set of each stage as a year-specific stage of the specific technology, and stores the determined stage in the technology information database.

9. The apparatus according to claim 1, wherein if the specific technology is selected from the visualized technology lifecycle, the year-specific stage acquisition module acquires technologies related to the specific technology from the technology information database and visualizes the related technologies, together with the current stage, the year-specific stage and the estimated next stage of the specific technology, through the visualization module, and if a specific related technology is selected from the visualized related technologies, the year-specific stage acquisition module acquires a current stage, a year-specific stage and an estimated next stage of the specific related technology and visualizes the acquired stages through the visualization module.

10. A computer-implemented visualization method of technology transition performed by a technology transition visualization apparatus, the method comprising steps of:
 (a) creating a feature set for each technology positioned on a technology lifecycle;
 (b) calculating a common feature value of feature sets of technologies belonging to the same stage in the technology lifecycle and creating an answer feature set of each stage;
 (c) if a specific technology is inputted, acquiring feature-related information for the specific technology by searching a bibliographic database and creating a representative feature set and a year-specific feature set of the specific technology using the acquired feature-related information;
 (d) determining a representative stage or a year-specific stage where the specific technology belongs to in the technology lifecycle by comparing the representative feature set or the year-specific feature set with the answer feature set, and estimating development speed of the specific technology using the year-specific stage;
 (e) visualizing the technology lifecycle which shows the representative stage of the specific technology; and
 (f) if the specific technology is selected from the visualized technology lifecycle, acquiring and visualizing a current stage, a next stage and a year-specific stage of the specific technology from a technology information database, wherein
 step (d) includes the steps of:
 (d-1) determining a representative stage where the specific technology belongs to in the technology lifecycle by comparing the representative feature set with the answer feature set, and determining a year-specific stage by comparing the year-specific feature set with the answer feature set; and
 (d-2) estimating a stage where the next stage of the specific technology will belong to in the technology lifecycle or a time required to move to the next stage, using the determined year-specific stage.

11. The method according to claim 10, wherein step (a) includes the steps of:
 acquiring feature-related information for calculating feature values of features contained in a predefined feature set by searching the bibliographic database for the technologies;
 calculating a feature value of each feature by technology using the acquired feature-related information; and
 creating a feature set containing the calculated feature values for each technology.

12. The method according to claim 10, wherein step (b) calculates common feature values for discriminating feature values of the technologies belonging to the same stage in the technology lifecycle from feature values of the other stages, and creates an answer feature set of each stage based on the common feature values.

13. The method according to claim 12, wherein the common feature value is at least one of an average, a range defined by minimum and maximum values, and a standard deviation.

14. The method according to claim 10, wherein step (c) includes the steps of:
 if the specific technology is inputted, acquiring feature-related information for calculating feature values of features contained in a predefined feature set by searching the bibliographic database;
 calculating a representative feature value of each feature using the acquired feature-related information and calculating year-specific feature values by classifying the feature-related information by the year; and
 creating a representative feature set using the calculated representative feature values and creating a year-specific feature set using the year-specific feature set.

15. The method according to claim 10, wherein step (d-1) determines a stage of an answer feature set having a common feature value closest to the representative feature value of the representative feature set among common feature values of the answer feature set of each stage as a stage where the specific technology belongs to in the technology lifecycle, and stores the determined stage in the technology information database.

16. The method according to claim 10, wherein step (d-1) determines a stage of an answer feature set having a common feature value closest to the feature value of the year-specific feature set among common feature values of the answer feature set of each stage as a year-specific stage of the specific technology, and stores the determined stage in the technology information database.

17. The method according to claim 10, wherein step (f) includes the steps of:
 if the specific technology is selected from the visualized technology lifecycle, acquiring technologies related to the specific technology from the technology information database and visualizing the related technologies, together with the current stage, the year-specific stage and the estimated next stage of the specific technology; and
 if a specific related technology is selected from the visualized related technologies, acquiring and visualizing a current stage, a year-specific stage and an estimated next stage of the specific related technology.

* * * * *